United States Patent
Persoon

(10) Patent No.: US 10,445,748 B2
(45) Date of Patent: Oct. 15, 2019

(54) ORDERING CONTENT BY MOBILE PHONE TO BE PLAYED ON CONSUMER DEVICES

(75) Inventor: Eric Hendrik Jozef Persoon, Dommelen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1505 days.

(21) Appl. No.: 11/814,384

(22) PCT Filed: Jan. 16, 2006

(86) PCT No.: PCT/IB2006/050155
§ 371 (c)(1),
(2), (4) Date: Jul. 20, 2007

(87) PCT Pub. No.: WO2006/077526
PCT Pub. Date: Jul. 27, 2006

(65) Prior Publication Data
US 2008/0212779 A1    Sep. 4, 2008

Related U.S. Application Data

(60) Provisional application No. 60/646,090, filed on Jan. 21, 2005.

(51) Int. Cl.
G06Q 30/02     (2012.01)
G06Q 20/06     (2012.01)
G06Q 10/06     (2012.01)
G06Q 50/18     (2012.01)
G06Q 20/40     (2012.01)

(52) U.S. Cl.
CPC ......... *G06Q 30/02* (2013.01); *G06Q 10/0631* (2013.01); *G06Q 20/0655* (2013.01); *G06Q 20/401* (2013.01); *G06Q 50/18* (2013.01); *G06F 2221/0797* (2013.01)

(58) Field of Classification Search
USPC .......................................................... 705/51
See application file for complete search history.

(56) References Cited

U.S. PATENT DOCUMENTS

| | | | |
|---|---|---|---|
| 6,816,596 B1 * | 11/2004 | Peinado et al. | 380/277 |
| 8,812,850 B2 * | 8/2014 | Barton et al. | 713/175 |
| 2001/0014615 A1 * | 8/2001 | Dahm et al. | 455/566 |
| 2002/0002413 A1 * | 1/2002 | Tokue | 700/94 |
| 2002/0048369 A1 * | 4/2002 | Ginter | G06F 21/10 |
| | | | 380/277 |
| 2002/0077984 A1 * | 6/2002 | Ireton | 705/51 |

(Continued)

FOREIGN PATENT DOCUMENTS

| | | | |
|---|---|---|---|
| WO | 2004102459 A | 11/2004 | |
| WO | 2004111804 A | 12/2004 | |

OTHER PUBLICATIONS

Muaffar Saj, WO 03/094123.*

(Continued)

*Primary Examiner* — Dante Ravetti

(57) ABSTRACT

A system, device and method are provided to purchase, download and obtain transferable rights to play content using a mobile telephone. In an alternative embodiment, the mobile telephone is used to purchase content, which then is downloaded using other channels, e.g., a broadband using other consumer devices and played by these other devices.

12 Claims, 6 Drawing Sheets

(56) References Cited

U.S. PATENT DOCUMENTS

| | | | |
|---|---|---|---|
| 2003/0028454 A1* | 2/2003 | Ooho | G06Q 10/0631 705/32 |
| 2003/0061607 A1* | 3/2003 | Hunter et al. | 725/32 |
| 2004/0010467 A1* | 1/2004 | Hori et al. | 705/50 |
| 2004/0030898 A1* | 2/2004 | Tsuria | G06F 21/10 713/171 |
| 2004/0060067 A1* | 3/2004 | Yi | 725/105 |
| 2004/0088510 A1* | 5/2004 | Hori | G06F 21/10 711/165 |
| 2004/0107435 A1* | 6/2004 | Anzai et al. | 725/35 |
| 2004/0249768 A1* | 12/2004 | Kontio | G06F 21/10 705/65 |
| 2005/0060584 A1* | 3/2005 | Ginter et al. | 713/201 |
| 2005/0111420 A1* | 5/2005 | Fujii | 370/338 |
| 2006/0029109 A1* | 2/2006 | Moran | G06F 16/635 370/538 |
| 2006/0045112 A1* | 3/2006 | Laiho | 370/419 |
| 2006/0213972 A1* | 9/2006 | Kelley | G06K 7/0008 235/380 |
| 2007/0244822 A1* | 10/2007 | Hogan | H04L 63/0428 705/57 |
| 2009/0011793 A1* | 1/2009 | Pocrass | 455/556.1 |

OTHER PUBLICATIONS

Lucy Sherriff: Nokia, Sony, Philips Tout Connectivity Utopia, Mar. 2004.

Smart Card Alliance: Philips and Visa International Showcase the Potential of Contactless Payment and Connectivity of the Consumer Electronics Show, Jan. 2004.

Near Field Communication White Paper, Feb. 2004.

Smart Touch Systems, Mar. 2004.

Philips and Samsung Join Forces for the Development of New Mobile Devices based on Near Field Communication, Aug. 2004.

* cited by examiner ent at the U.S. National Phase application
ORDERING CONTENT BY MOBILE PHONE TO BE PLAYED ON CONSUMER DEVICES This application is the U.S. National Phase application under 35 U.S.C. § 371 of International Application No. PCT/IB2006/050155, filed on Jan. 16, 2006, which claims the benefit of U.S. Provisional Application No. 60/646,090, filed on Jan. 21, 2005.

The present invention relates to a system, device, and method to order, pay for, download and obtain transferable rights to play content using a mobile telephone. Alternatively, the mobile telephone is used to purchase content, which is then downloaded using other channels, i.e., a broadband using other consumer devices and played by these devices.

Typically, in buying downloadable content, the same channel is used to buy content to consume or use the content. For example, content (music, video clips) can be bought on mobile phones to be consumed on mobile phones. Content can also be bought on personal computers (PCs), e.g., Apples iTunes, to be consumed on PCs. The security of the transaction is also an issue for such content-providing services.

These existing solutions to purchasing and obtaining content pose several problems. Purchasers must be co-located with a consumer device in order to obtain content. Secondly, they require modifying consumer devices. Thirdly, they require some type of connection to a provider and a payment service. The latter is a complex infrastructure and limits the consumer to a given provider and payment service. Makers of consumer devices resist modifying their products in such a limited fashion.

Thus, given the demand for pay-per-content downloadable products, there is a need for a secure ordering-to-download protocol that does not require a major consumer device modification and does not limit content sources and payment options.

The system and method of the present invention provide a technique for selecting, purchasing and obtaining transferable rights to digital content using the already available infrastructure supporting mobile telephones.

In this system and method, existing payment services available on mobile telephones, offered by the operators thereof (for ordering ring tones, etc.), provide a secure way to transfer the rights to the content to consumer equipment that is ubiquitous, readily available, has a wide geographic distribution, reliable and already in the possession of consumers. Further, the system and method of the present invention does not require any access by consumer devices to payment services, making consumer equipment much simpler to implement. Moreover, the consumer devices do not need to be connected on-line, making it possible to consume content on consumer equipment that is not connected to an on-line service, e.g., portable music and video players.

It is to be understood by persons of ordinary skill in the art that the following descriptions are provided for purposes of illustration and not for limitation. An artisan understands that there are many variations that lie within the spirit of the invention and the scope of the appended claims. Unnecessary details of known functions and operations may be omitted from the current description so as not to obscure the present invention.

The system and method of the present invention provide a mobile telephone-based system for ordering, paying for and transferring rights to downloadable content. In a preferred embodiment, content can be downloaded to the mobile telephone and transferred from the mobile telephone to another device for consumption of the content. In a second preferred embodiment, the content is directly downloaded to the consumer device.

Mobile entertainment is a flourishing business, driven in better part by the wide availability and easy connectivity of wireless media devices. In the system and method of the present invention, a component of the technology of Near Field Communications (NFC) allows mobile network operators to leverage their infrastructure investment to support using it for mobile entertainment content selection, purchase and delivery. The present invention provides a secure environment for delivery of content to mobile devices by providing Digital Rights Management (DRM) protection of the Open Mobile Alliance (OMA) DRM 2.0 Enabler Release. The OMA DRM 2.0 enables, among other features, the protection of content, such as music tracks, video clips, and games with enhanced security and improved support to preview and share content. OMA DRM 2.0 supports audio/video rendering, streaming content and access to protected content using multiple devices, such as the transferable rights of the present invention.

Figure 1:
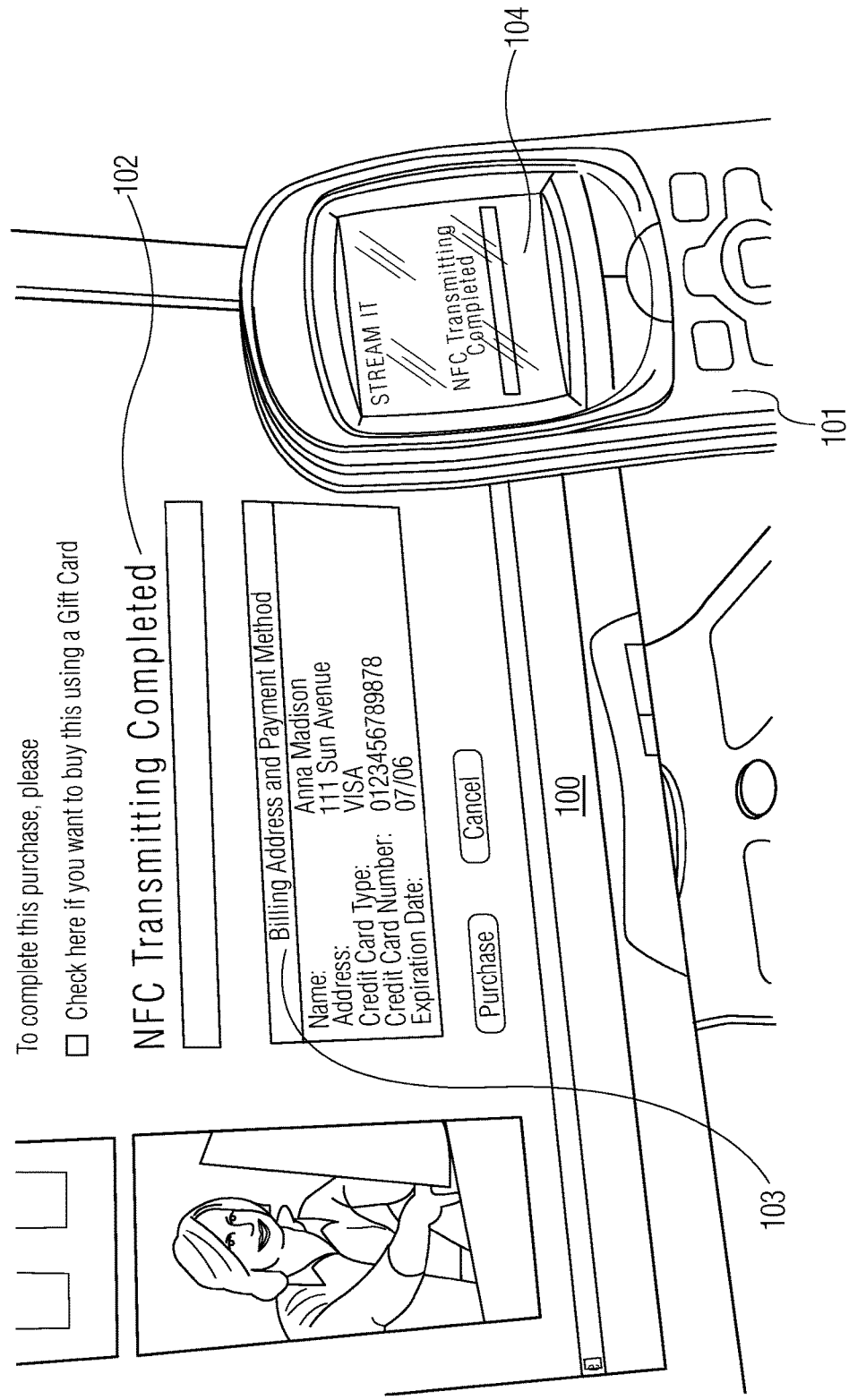
FIG. 1 illustrates a user-selecting content from a website and downloading the rights to a mobile telephone.

Referring now to FIG. 1, in a preferred embodiment a user selects a track from a music-distributing website 100 using a personal computer (PC), pays for the track using a credit card service of the mobile telephone provider 103 and downloads the rights to their mobile telephone 101. In an alternative embodiment the user selects a portal service directly on his mobile phone and on this portal selects some content and buys it. The purchase transaction is handled by the mobile operator (not via a credit card) and the purchase price is charged to the purchaser's telephone account. The download of the object rights in the first embodiment is accomplished using NFC technology 102. In this case the object rights have been obtained through a PC-then the object rights are transferred from the PC to the mobile telephone using NFC technology. In the alternative embodiment, the object rights are directly sent by the mobile telephone operator to the mobile telephone over the wireless telephone channel in a secure way. This alternative is much simpler because a PC is not required and the purchase can be made at any time and any place. Note that any interface to the Internet that supports a Web browser or an equivalent interface can be used to purchase the content, including the mobile telephone itself.

Figure 2:
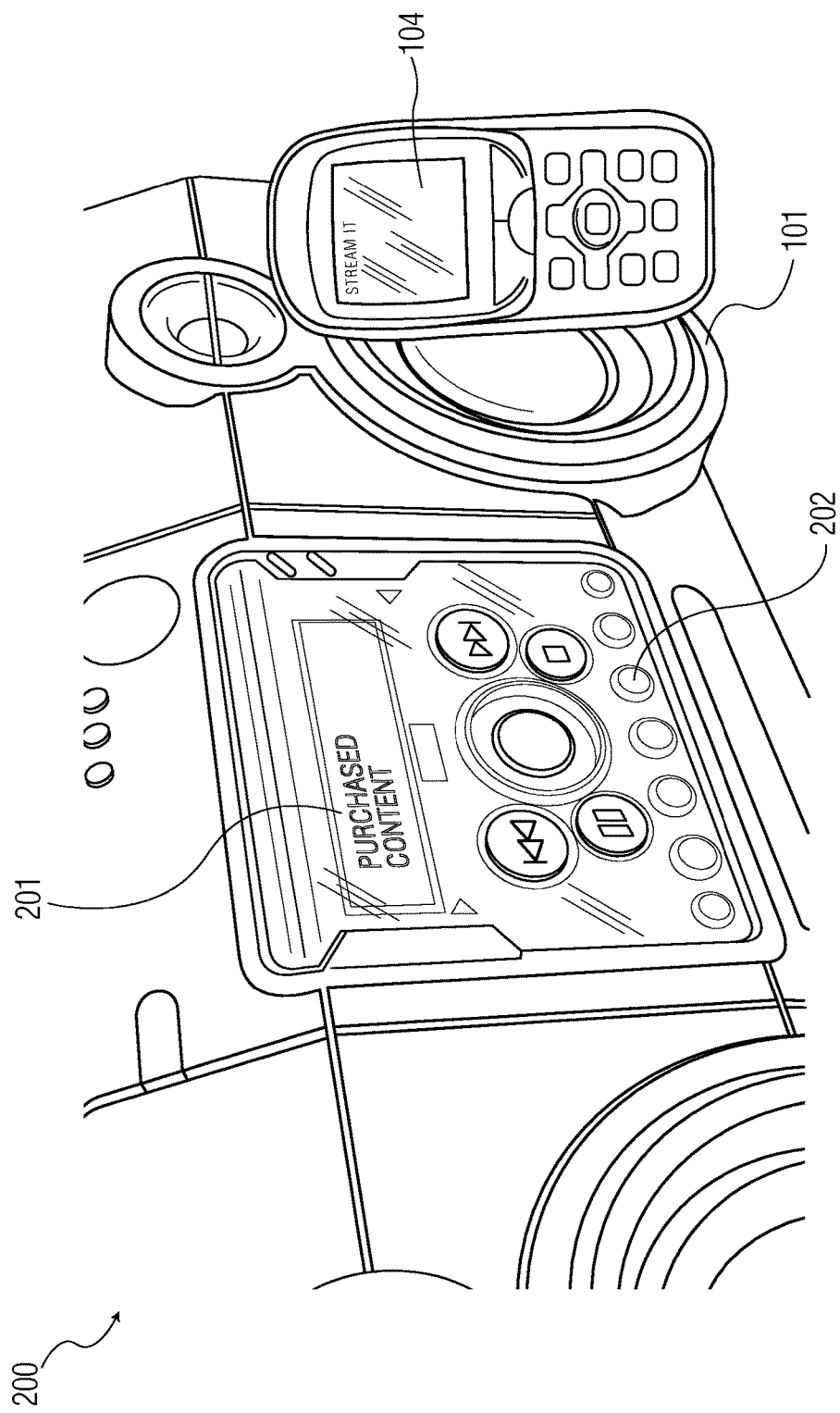
FIG. 2 illustrates the user placing the mobile telephone of FIG. 1 next to an Internet-enabled stereo system for streaming of the selected content.

FIG. 2 illustrates the user placing the mobile telephone 101 next to an Internet-enabled stereo system 202, to download the rights to the purchased content, and the stereo system automatically streams the selected track, e.g., the purchased content 201. Content can be downloaded to a mobile device with sufficient memory and then transferred to another device. The stereo can have a local non-volatile memory to capture the track and then repeatedly render it. Making removable copies, i.e., on a CD/DVD or a cassette tape or other removable memory is also an option.

The essential feature of a preferred embodiment is that the mobile telephone can securely transfer rights to consumer devices to play content on those consumer devices. Further, when it is possible to establish a secure connection between the mobile telephone and a consumer device, all relevant information concerning a purchased content can be transferred between them. This allows the consumer device to automatically retrieve the necessary content from a content provider and make it available in a transparent way on all local devices of a purchaser, i.e., home consumer devices and other portable devices owned by the content purchaser.

In all embodiments, purchased content is distributed in encrypted form and can be transported in encrypted form to, i.e., a home and across home devices, in a transparent and unlimited fashion. In a preferred embodiment, NFC is used for the transfer of rights from the mobile telephone to the consumer devices, thus, providing a more secure channel than other communication channels.

Figure 3:
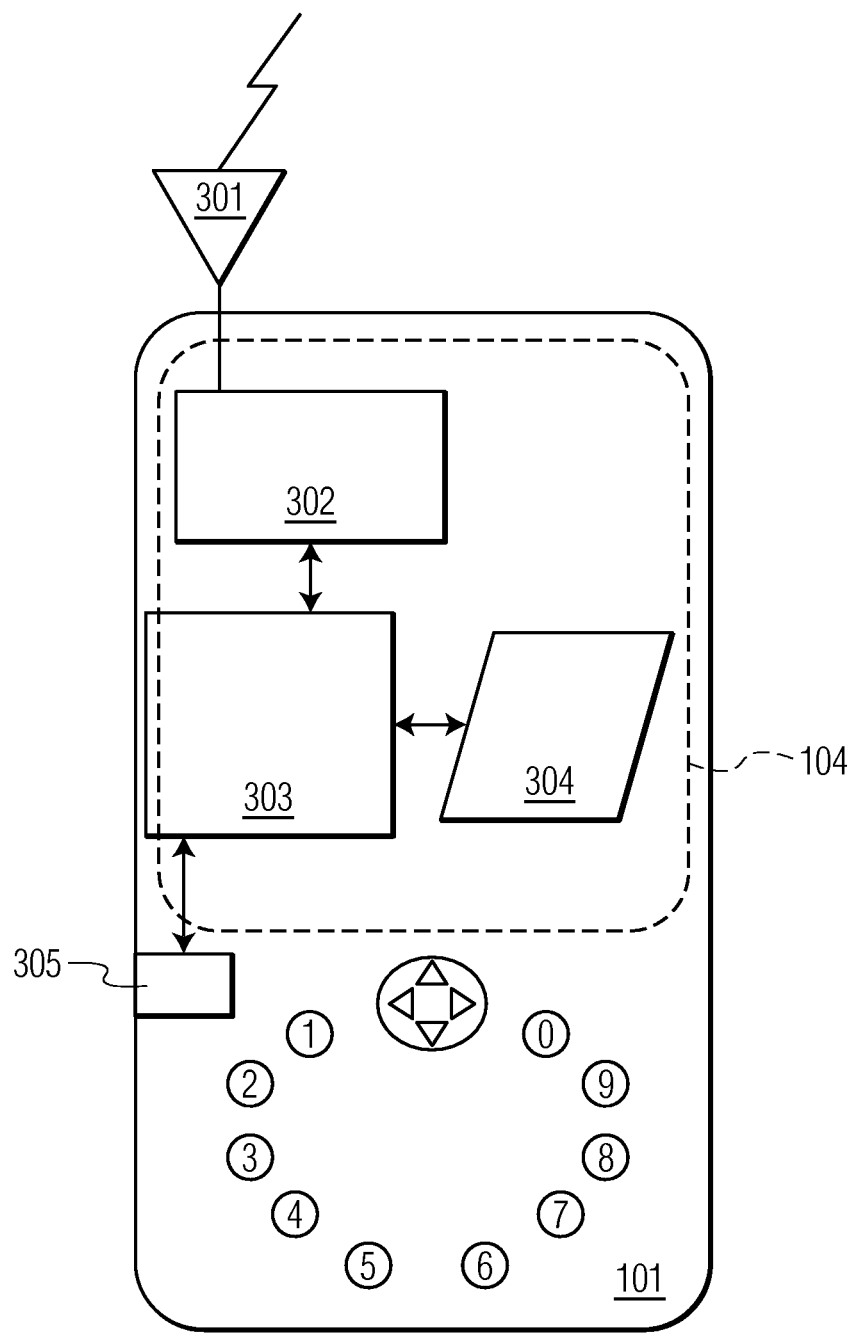
FIG. 3 illustrates a mobile telephone modified according to the present invention.

A preferred hardware implementation is illustrated in FIG. 3, in which a mobile telephone is modified according to the present invention by extending the mobile telephone's capabilities with and NFC-compliant module 302 comprising a transceiver (not shown) interface to an antenna 301 for sending and receiving wireless messages. Any device that is to function in cooperation with this NFC-enabled mobile telephone must also be modified to be NFC-enabled. In a preferred embodiment, the mobile telephone has been modified to incorporate a DRM system, i.e., the OMA DRM 2.0 standard discussed above (see also www.openmobile alliance.org/tech/release.html, the entire contents of which are hereby incorporated by reference). A DRM system includes capabilities to export the right to play a content object and communicates this right to an NFC interface. In a preferred embodiment, this is done by exchanging the key to decrypt the content between the mobile telephone and a consumer device. This key is received using NFC by a consumer device and the consumer device uses this key to decrypt downloaded content. The object keys obtained on the mobile telephone are managed in a Key and content management module 303 also incorporated into the mobile telephone that receives and stores the key at the time of the purchase of the content (see FIG. 1) in the key and content storage 304. The mobile telephone can include at least one USB port 305 operably connected to the key and content management module 303 to receive content over a hardwired connection from another device that previously received purchased content.

Figure 4:
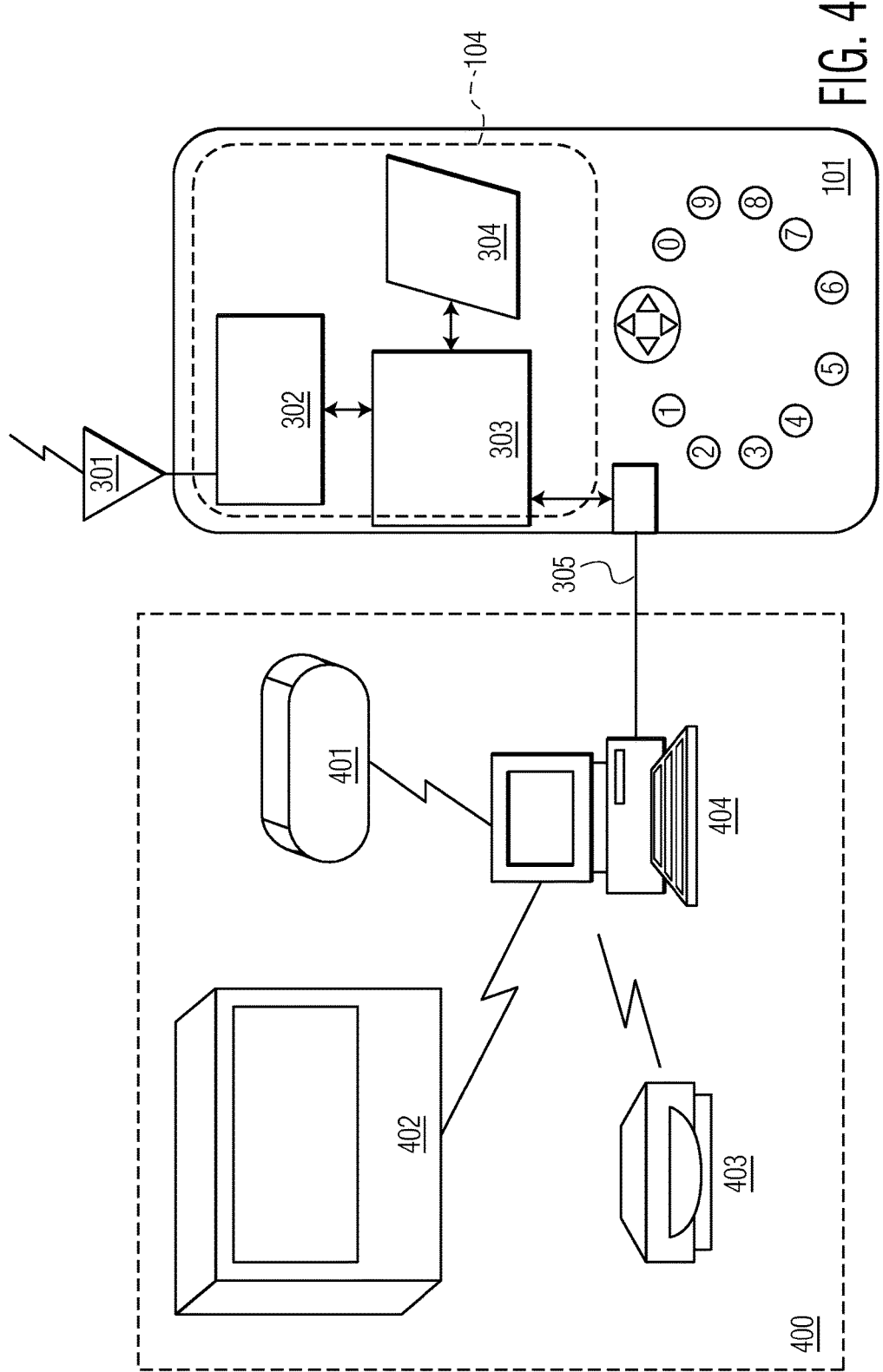
FIG. 4 illustrates a wireless home network comprising wireless devices communicating with a home gateway using, e.g., WiFi technology or wired Ethernet technology to render and download content purchased with a mobile telephone in accordance with the present invention.

A home network is also required, see FIG. 4. As illustrated, NFC technology is used in each device only to transfer the object rights and keys since the bandwidth of NFC is too limited to transfer voluminous data.

The mobile telephone requires a connection to the home network for at least two usage scenarios. First, when the purchaser is not at home when content is bought, the purchaser may need to connect to the consumer device that is at home to communicate information concerning the purchased content (i.e., the location on the Internet for obtaining the content). If the purchase of the content is accomplished when the purchaser is at home, the mobile telephone does not need to be connected to the home network. In the latter case, NFC is used to communicate the purchased content information (including the object rights) to the consumer device.

In a preferred embodiment, a secure on-line wired or wireless connection is established between the mobile telephone 101 and the home network 400 via a home gateway 404. Then the mobile telephone can communicate over the home network 400 with at least one consumer device 401-404 connected to the home network to inform at least one consumer device 401-404 of at least one purchased content item. An access point is needed only when the consumer devices are connected wirelessly (using, e.g., WiFi) to the home gateway, and the role of the home gateway is to connect to the Internet.

In a preferred embodiment, the home consumer device takes action to request the content to be downloaded rather than having the content pushed by the content provider because of firewall and other issues. There are two ways to instruct a consumer device 401-404 to do this: (1) when the purchaser is away from home, the mobile telephone 101 can send a message over a GSM/GPRS channel (or its equivalent) to the home consumer device 404-404 in a secure way; and (2) when the purchaser is at home the purchaser can send a message from the mobile telephone 101 to the home device over GPRS, but there is also the possibility of activating the home consumer device 401-404 directly, i.e., using NFC. The main point here is that the mobile telephone 101 itself, having all the knowledge of the object rights, can instruct the consumer device (automatically) 401-404 to request that the content be downloaded to the consumer device 401-404. Then, the home consumer device 401-404 can decrypt the downloaded content using the communicated key sent to the consumer device 401-404 by the mobile telephone 101.

Then, when the purchaser wants to render the downloaded content, i.e., view or hear or play it, the purchaser needs only to start the consumer device 401-404 and is informed that content has been downloaded. For example, a TV screen 402 displays the titles of videos that have been automatically downloaded by the TV 402. As a part of the User Interface provided by the system and method of the present invention, the consumer device (in this case the TV) can ask the purchaser to put the mobile telephone near the NFC connection on the consumer device. The key can be transferred to the consumer device 401-404 without any action required on the mobile telephone 101. This makes the application very intuitive and easy to use for the purchaser.

Figure 5:
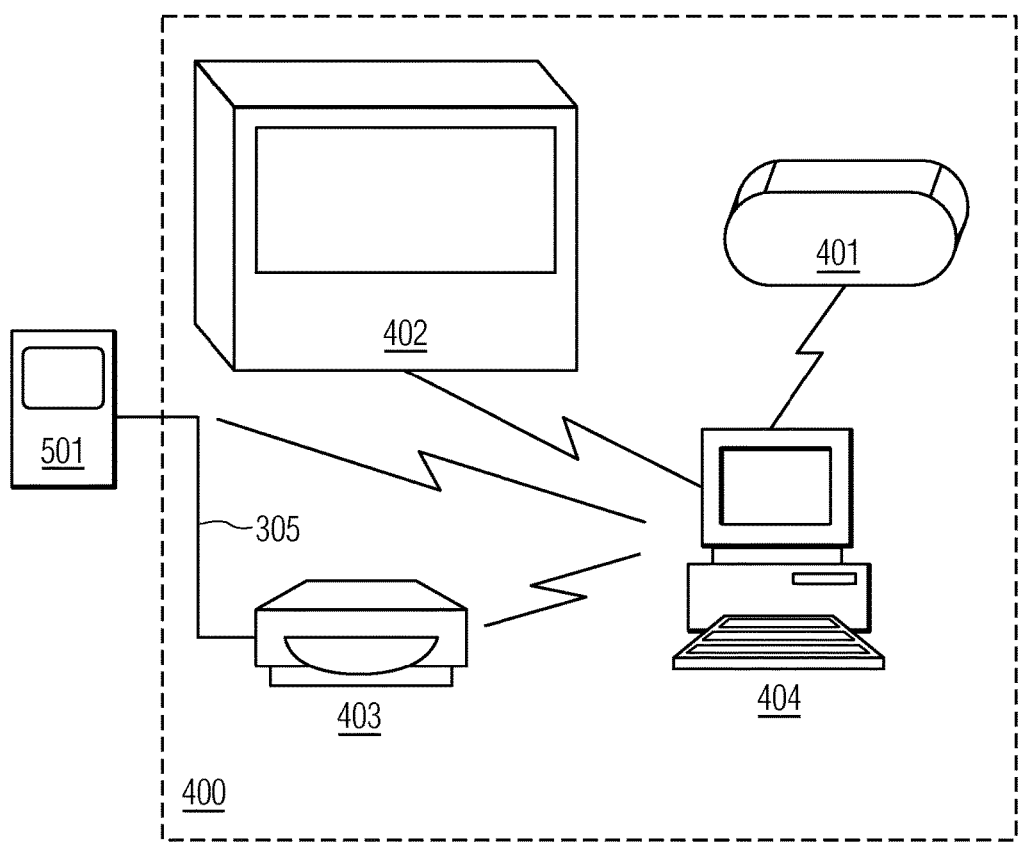
FIG. 5 illustrates a portable player interfaced to the wireless network of FIG. 4 to transfer downloaded content to a portable player via a hardwired connection, according to the present invention.
Figure 6:
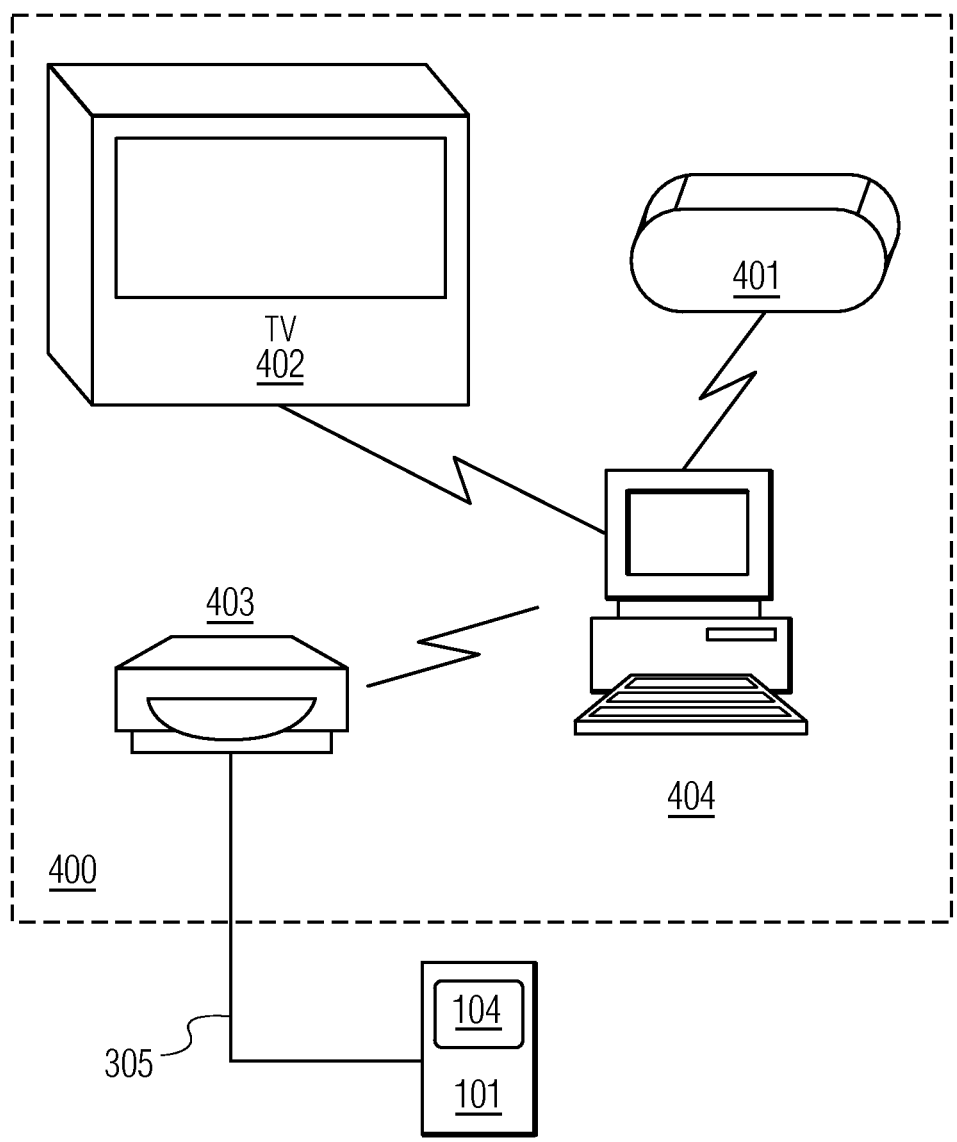
FIG. 6 illustrates a mobile telephone used to purchase content transferring downloaded content to the mobile telephone via a hardwired connection, according to the present invention.

In an alternative embodiment, illustrated in FIG. 5, if the purchaser wants to transfer the identical downloaded content to a portable player 501, a suitable interface must be available on the portable device, e.g., USB 305, and the user must transfer the content that was previously downloaded to a network device 401-404 to the portable player 501. In the present NFC example, an NFC interface must also be available on the portable player 501 and the portable player 501 must be modified in accordance with the present invention. The consumer devices 401-404 must be modified in the following way: have an NFC interface (to communicate with the mobile telephone), have a means to receive an object right or a key in order to decrypt the received content and a means to decrypt the received content (in a software or a hardware). In order to play the purchased content on the NFC-modified portable player 501, the purchaser must hold the mobile telephone 101 close to the portable player 501 so that the content key can then be transferred from the mobile telephone 101 to the portable player 501. Then the portable player 501 can decrypt and play the purchased content. It should be noted that another person other than the purchaser could perform some of these required actions if that other person has access to the mobile telephone of the purchaser and the use of the term purchaser is not meant to be limiting in any sense.

In another alternative embodiment, illustrated in FIG. 5, a purchaser may want to purchase content to be used on a mobile telephone 101 but does not want to use the 3G or GPRS channel of the mobile telephone 101 to download the purchased content. Instead, the purchaser first purchases the content (see, e.g., FIG. 1) and then downloads the content to a consumer device that includes storage, e.g., a DVD/CD recorder 403 of a home network 400. Another connection, such as a USB connection 305, is used to transfer the content from the storage of the consumer device 403 to the mobile telephone 101 where it is decrypted and played at the purchaser's convenience.

The present invention is not limited to mobile entertainment, but is applicable to other types of content delivery services such as on-the-spot customized news and information.

While the preferred embodiments of the present invention have been illustrated and described, it will be understood by those skilled in the art that the management frame, device architecture and methods as described herein are illustrative, and various changes and modifications may be made and equivalents may be substituted for elements thereof without departing from the true scope of the present invention. In addition, many modifications may be made to adapt the teachings of the present invention to a particular situation without departing from its central scope, e.g., using a private transmission media such as cable. Therefore, it is intended that the present invention not be limited to the particular embodiments disclosed as the best mode contemplated for carrying out the present invention, but that the present invention include all embodiments falling with the scope of the appended claims.

The invention claimed is:

1. A system including an interface device, a plurality of consumer devices to obtain at least one object right to at least one content object to be played on any consumer device of said plurality, wherein at least one of the plurality of consumer devices is an Internet connected network device, the system comprising:
   a first device and a second device of the plurality of consumer devices;
   the first device having:
      a first device processor coupled to the interface device; and
      a non-transitory first device memory containing instructions which when executed by the first device processor causes the first device processor to perform acts of:
         transmitting, by the first device, a request to a content provider to purchase a content object through the first device;
         receiving, by the first device, from the content provider, an object right and an object decryption key corresponding to the requested content object;
         storing, by the first device, the object right and the object decryption key;
         transmitting, by the first device to the second device, information that identifies the requested content object; and
      the second device having a second device processor and a non-transitory second device memory containing instructions which when executed by the second device processor causes the second device processor to perform acts of:
         receiving, by the second device from the first device, the information that identifies the requested content object;
         downloading, by the second device, the requested content from the content provider based on the received information that identifies the requested content object;
         storing, by the second device, the downloaded content;
         displaying, by the second device, a request to a user that the first device be brought in near field communications (NFC) proximity to the second device;
         retrieving, by the second device, the object right and the object decryption key from the first device;
         determining, by the second device, the object's rights from the retrieved object right; and
         decrypting, by the second device, the downloaded content using the retrieved object decryption key in accordance with the determined object's rights.

2. The system of claim 1, wherein the interface device and the second device include near field communications (NFC) technology.

3. The system of claim 1, wherein the act of downloading the requested content comprises an act of downloading the requested content via a wired coupling.

4. The system of claim 3, wherein the second device further comprises a USB port; and the act of downloading the requested content comprises an act of downloading the requested content via the USB port.

5. The system of claim 2, wherein the second device is a portable content player and the second device processor of the portable content player performs the act of downloading the requested content to the portable content player via a wired coupling.

6. The system of claim 5, wherein:
   the first device further comprises a first USB port;
   the portable content player further comprises a second USB port; and
   the wired coupling is a wired connection between the first and second USB ports.

7. The system of claim 1, wherein said interface device comprises an antenna connected to a receiver and transmitter for receiving and sending the object right and object decryption key from and to, respectively, the first device.

8. The system of claim 7, wherein the interface device includes near field communications (NFC) technology.

9. A method to obtain at least one object right to at least one content object to be played on any of a plurality of consumer devices, the method comprising acts of:
   transmitting, by a mobile phone, a request to a content provider to purchase a content object through the mobile phone;
   receiving, by the mobile phone, from the content provider, an object right and an object decryption key;
   storing, by the mobile phone the object right and the object decryption key;
   transmitting from the mobile phone to a second device information that identifies the requested content object;
   receiving by the second device from the mobile phone the information that identifies the requested content object;
   downloading, by the second device, the requested content from the content provider in response to the information that identifies the requested content object;
   storing, by the second device, the downloaded content;

displaying, by the second device, a request to a user that the mobile phone be brought in near field communications (NFC) proximity to the second device;

retrieving, by the second device, the object right, and the object decryption key from the mobile phone; and decrypting, by the second device, the downloaded content using the retrieved object decryption key in accordance with the retrieved object right.

10. The method of claim 9, wherein the mobile phone and the second device comprise near field communications (NFC) communication technology.

11. The system of claim 1, wherein the first device is a mobile telephone and the content provider is a mobile telephone operator.

12. The method of claim 9, wherein the content provider is a mobile telephone operator, the method comprising an act of the mobile telephone operator charging a mobile telephone account associated with the mobile phone for the requested content object.

* * * * *